United States Patent [19] [11] Patent Number: 5,819,165
Hulkko et al. [45] Date of Patent: Oct. 6, 1998

[54] SYSTEM FOR REGULATING THE POWER OUTPUT OF AND LINEARIZING THE TRANSMISSION SIGNAL FROM A RADIO TRANSMITTER

[75] Inventors: Jaakko Hulkko, Oulu; Merja Vuolteenaho, Helsinki, both of Finland

[73] Assignee: Nokia Mobile Phones Ltd., Salo, Finland

[21] Appl. No.: 884,114

[22] Filed: Jun. 27, 1997

Related U.S. Application Data

[63] Continuation of Ser. No. 556,565, Nov. 13, 1995, abandoned.

[30] Foreign Application Priority Data

Nov. 14, 1994 [FI] Finland ..................................... 945344

[51] Int. Cl.[6] .................................................. H04B 7/005
[52] U.S. Cl. .............................. 455/126; 455/84; 455/115
[58] Field of Search .................................. 455/82, 83, 84, 455/85, 86, 87, 78, 115, 116, 126, 127, 275, 67.4

[56] References Cited

U.S. PATENT DOCUMENTS

| | | | |
|---|---|---|---|
| 2,213,006 | 11/1940 | Lewis | 455/126 |
| 4,094,224 | 6/1978 | Hibino | 455/67.4 |
| 4,392,245 | 7/1983 | Mitama | 455/115 |
| 5,001,776 | 3/1991 | Clark | 455/234.1 |
| 5,109,535 | 4/1992 | Kume et al. | 455/63.4 |
| 5,291,147 | 3/1994 | Muurinen | 330/136 |
| 5,291,150 | 3/1994 | Saarnimo et al. | 330/279 |
| 5,392,464 | 2/1995 | Pakonen | 455/115 |
| 5,404,585 | 4/1995 | Vimpari et al. | 455/115 |
| 5,432,473 | 7/1995 | Mattila et al. | 330/133 |
| 5,434,537 | 7/1995 | Kukkonen | 330/2 |
| 5,442,811 | 8/1995 | Kobayashi et al. | 455/115 |
| 5,450,620 | 9/1995 | Vaisanen | 455/127 |
| 5,457,813 | 10/1995 | Poutanen | 455/127 |
| 5,483,681 | 1/1996 | Bergsten et al. | 455/126 |
| 5,487,176 | 1/1996 | Yoneyama | 455/126 |
| 5,507,014 | 4/1996 | Wray et al. | 455/126 |

FOREIGN PATENT DOCUMENTS

| | | |
|---|---|---|
| A 330166 | 8/1989 | European Pat. Off. . |
| A 438770 | 7/1991 | European Pat. Off. . |
| A 865149 | 6/1987 | Finland . |
| A 940506 | 8/1994 | Finland . |

*Primary Examiner*—Edward F. Urban
*Attorney, Agent, or Firm*—Perman & Green, LLP

[57] ABSTRACT

The invention is based on utilizing the receiver of a radio device to detect measured quantities related to a transmission signal. In the power regulating method according to the present invention, which is based on a power regulating loop, transmission power is detected in the receiver of the radio device. Part of the transmission signal ($f_{TX}$) is input to the carrier frequency part of the signal path of the receiver by and detected. A signal that is proportional to the power level is produced by a RSSI detector of the receiver, for example. The same circuit can also be utilized in the linearization of a transmission signal based on a closed loop by means of predistortion. Both the power regulation method and the linearization method can be applied in radio telephone systems based on both time-division and continuous transmission and reception.

30 Claims, 2 Drawing Sheets

1

SYSTEM FOR REGULATING THE POWER OUTPUT OF AND LINEARIZING THE TRANSMISSION SIGNAL FROM A RADIO TRANSMITTER

This application is a continuation of copending application Ser. No. 08/556,565 filed on Nov. 13, 1995 now abandoned.

BACKGROUND OF THE INVENTION

A method and circuit for regulating the power of and linearizing a transmission signal of a radio device.

1. Field of the Invention

The present invention is directed to methods for regulating transmission power and linearizing a transmission signal with a regulating loop and a circuit for realizing said methods.

2. Description of the Prior Art

Transmission power in radio telephone systems is regulated to make re-use of frequency channels more effective. The goal is to attain a suitable transmission level which is adequate for reception of the transmission, but which will not cause noise in radio communication of a distant radio device using the same channel. In most cellular systems, the transmission power level is determined by control signals received from a base station. Permissible power levels are typically limited to specific power classes by system specifications. Another reason for power level regulation, especially in battery-powered hand-held telephones, is to minimize power consumption, thus increasing talk time.

Power regulation of a transmission signal of a mobile phone is usually realized with a closed regulating loop resembling the one shown in FIG. 1. A modulated carrier frequency transmission signal $f_{CHOD}$ is bandpass filtered 11 and amplified with one or more power amplifiers 12 before entering a duplexer, as is known. Power regulation is performed by sampling the power of the transmission signal $f_{TX}$ by means of a directional switch 13 and inputting the sample to a regulating loop. A detector diode 14 converts the sample into a direct voltage $V_d$, which is input to a comparator 15. Based on the difference signal of the voltage $V_d$, which is proportional to the power, and a reference voltage $V_{REF}$, a control signal $V_{CNTL}$ is produced for controlling an adjustable amplifier/attenuator, VCA, 16, which is part of the transmission chain. The functions of the regulating loop can be realized either analogically or digitally in a signal processing module of the radio telephone. The reference voltage $V_{REF}$, which determines the transmission power level, is usually derived from a control signal sent by a base station.

The greatest problems encountered in transmitter power regulation are related to power level detection by means of a diode. The operating range of a diode that is linearly proportional to the power level to be detected is narrow, limiting the dynamics of the regulating loop, thereby decreasing the accuracy of the regulation. At low signal levels the voltage detected by the diode is inversely proportional to the square of the voltage, i.e., the power, according to the characteristic curve of the diode. At high signal levels the voltage detected by the diode becomes directly proportional to the power, and finally becomes constant. The voltage detected at very low signal levels can not be differentiated from noise. A detector diode usually must be biased, placing the operating point of the detector in an optimal range. Another problem is caused by temperature-dependent changes in the characteristics of the components in the regulating loop, particularly the detector diode. Additional stabilizing circuits, such as those presented in U.S. Pat. No. 4523155 and EP patent application 546693, attempt to compensate for the inaccuracy of the regulation caused by said temperature-dependent changes and said poor dynamics of diode detection. The importance of regulating accuracy and speed of the regulating loop is emphasized in power regulation of the burst-form transmissions of time-division, TDD, systems. Problems introduced by said additional circuits are, naturally, increased component costs, the need for more circuit board area and the complicated nature of the circuitry.

In addition to power, distortion can also be measured from the transmission signal. Distortion is a problem particularly in radio telephone systems whose modulating procedure includes amplitude modulation. In certain digital systems modulation is realized with differential coding, which is partly based on amplitude modulation. As a prerequisite for using a modulating procedure based on phase or amplitude modulation, the power amplifier of the transmitter must operate in a sufficiently linear range to assure that modulation information related to both amplitude and phase can be detected with sufficient accuracy. Implementation of an efficient and economically feasible non-linear amplifier is allowable if the transmission signal can be predistorted so as to compensate for distortion caused by the non-linearity of the amplifier. Many known methods exist for producing predistortion information. Some of said methods are based on a closed regulating loop in which a sample signal that is proportional to the distortion is obtained from the output of the amplifier and compared to the original transmission. The predistortion that corrects the deviation detected between the signals is added to the original transmission, usually by changing the modulation coefficient of the modulator. A typical predistortion circuit based on a closed loop is presented in U.S. Pat. No. 4291277.

OBJECTS OF THE INVENTION

The problems mentioned above that are related to power level detection can easily be eliminated by means of the present invention. By means of the present invention, it is possible to achieve quick, noise-tolerant regulation and good regulation dynamics. The regulating circuit described in the present invention is simple and inexpensive to manufacture, because it can be realized in a transceiver by adding only a few or no extra components. The circuit can also be applied to produce predistortion information. The present invention is characterized by what is presented in the characterizing part of claims 20, 26 and 31.

SUMMARY OF THE INVENTION

The present invention is based on utilizing the receiver of a radio device to detect measured quantities related to a transmission signal. In the power regulation method according to the present invention, transmission power is detected in the receiver of the radio device. Part of the amplified and modulated carrier signal of the transmitter is input to the receiver of the radio device by means of a power divider, such as a directional coupler. The signal sample input to the receiver is detected. A signal proportional to the transmission power can be obtained by means of a received signal strength indicator (RSSI), for example, which is used to determine the strength of a signal transmitted by a base station. A control signal for controlling an adjustable amplifier that is part of the transmission chain is produced from said signal that is proportional to the power level by means of known methods, in the signal processing unit of the radio device, for example. A circuit in its simplest form that implements the described method includes a power divider, one of whose outputs is connected to the carrier frequency part of the signal path of the receiver, advantageously after the preamplifier and bandpass filter, but before the mixer. Regulation is easy to realize in time-division (TDD) based radio telephone systems because the receiver usually is not in use during the transmission time period. The present invention is also applicable in frequency-division (FDD) or code-division (CDMA) based radio telephone systems that implement continuous reception and transmission, by momentarily muting the receiver channel to measure transmission power in the manner described above. If necessary, the power sample signal can be disconnected from the receiver or attenuated to minimize interferences in the reception.

In one advantageous embodiment the circuit according to the present invention can also be implemented to linearize the transmission signal by using predistortion, either in conjunction with power regulation or independently. This is based on the detection of transmission signal samples in the receiver and the further processing of the samples in the signal processing unit. A signal that includes predistortion information controls a modulator or possibly an adjustable amplifier of the transmitter. This embodiment of the present invention is especially advantageous in radio telephones that incorporate both frequency or phase modulation and amplitude modulation. In an analog operating mode that incorporates frequency or phase modulation, the power amplifier can be an inexpensive, non-linear amplifier. A digital operating mode that incorporates /4-DQPSK modulation, for example, requires linear amplification due to the AM components. By applying predistortion according to the present invention, a non-linear amplifier is also suitable for use in the digital operating mode, resulting in noticeable savings in component costs and improved transmitter efficiency.

The circuit according to the present invention can also be used to diagnose aspects of the operation of a radio device other than transmission power and transmission signal distortion that are described above. Other applications of the circuit include sensitivity measurements of an analog receiver, for example.

BRIEF DESCRIPTION OF THE DRAWINGS

The present invention is described in detail below, with references to the enclosed drawings.

DETAILED DESCRIPTION OF THE PREFERRED EMBODIMENT(S)

Figure 1:
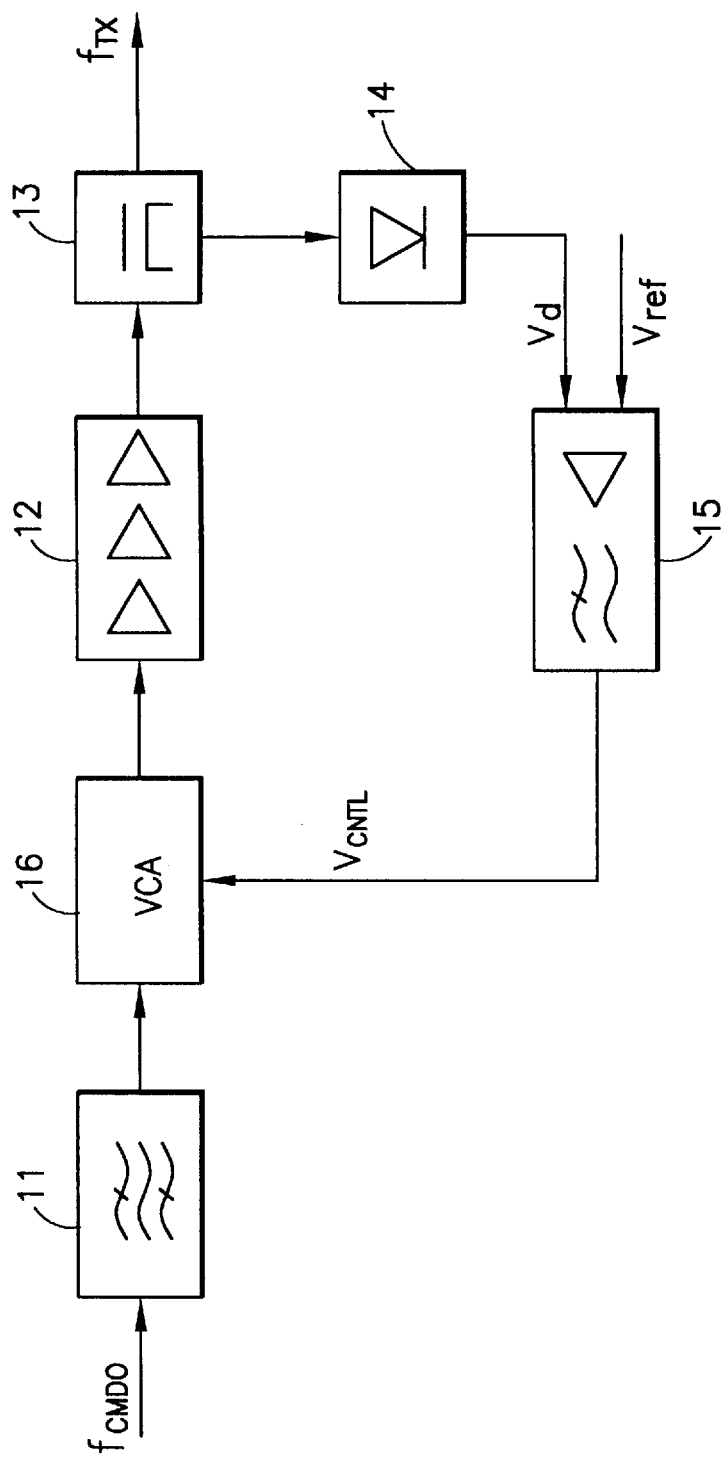
FIG. 1 shows a closed power regulating loop according to the prior art.
Figure 2:
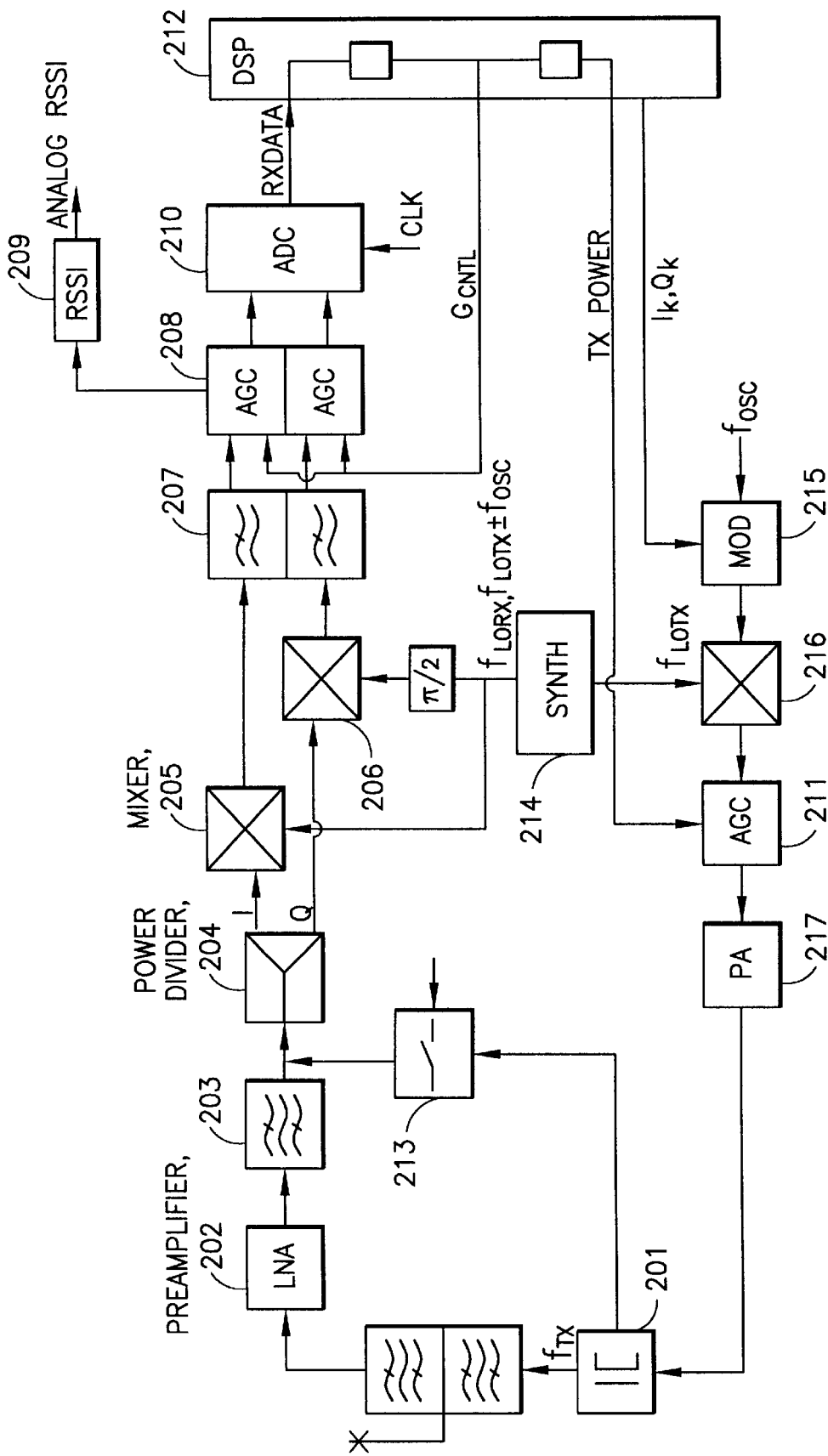
FIG. 2 shows a regulating loop according to the present invention, in which power and distortion are detected in a direct conversion receiver.

The prior art according to FIG. 1 is explained earlier in the present application. The radio device based on direct conversion reception shown in FIG. 2 is used as an application example for simplicity. The radio device of this example operates in both analog and digital operating modes. The modulating method used in the digital operating mode is π/4-DQPSK modulation. Application of the present invention to the radio device of the figure does not place limitations on the method of modulation used.

A transmission signal $f_{TX}$ is detected by inputting a small part of said signal to the carrier frequency part of the signal path of a receiver, advantageously to the output of a bandpass filter 203, by means of a directional coupler 201. When quadrature detection is used, said signal is divided into two parts by means of a power divider 204 to mix a sideband containing I and Q components to the carrier frequency in mixers 205 and 206. The resulting signal components are low pass filtered 207 and amplified 208.

RSSI information, which is proportional to the power, is produced based on the amplification of an amplifier, AGC, 208 and the level of a receiver signal RX DATA, which is sampled by means of an A/D converter 210. Because the level of the received signal is made constant by means of said adjustable amplifier 208, in practice a signal proportional to the power is obtained from a control signal $G_{CNTL}$ of the amplifier 208, which is adjusted to be proportional to a reference level. From said thusly detected signal that is proportional to the power, a signal, TX POWER, which controls an adjustable amplifier, AGC, 211, is produced, e.g., in a signal processing unit, DSP, 212, of the device. In the analog operating mode a signal that is proportional to the power can be obtained directly from a so-called RSSI circuit 209, which is not described in more detail herein. The circuit is typically part of an integrated FM detector component.

A circuit that realizes the present invention may include, in addition to the directional coupler 201, a switch element 213 that switches part of the transmission signal $f_{TX}$ to the receiver only when the output power is being detected. The switch element 213 may be an adjustable attenuator, for example. The power divider can also be implemented capacitively, e.g., by means of a capacitor. The switch element is not mandatory in a time-division based digital operating mode, because the transmitter usually is not in operation during the reception time period and mixing of transmission and reception signals is not even theoretically possible. In the analog operating mode, where transmission and reception occur simultaneously, signal leakage from the transmitter through the directional coupler 201 in the direct conversion receiver of FIG. 2 does not noticeably disturb normal reception, because the transmission signal $f_{TX}$ does not mix to the carrier frequency with the local frequency $f_{LORX}$ of the receiver, and the transmission signal $f_{TX}$ and its mixing results with the reception signal are filtered out before signal detection. Therefore, the switch element 213 is not mandatory for the sake of spurious response in the analog operating mode, either. If the reception signal is mixed to the intermediate frequency, as is the case in a conventional heterodyne receiver, the transmission frequency $f_{TX}$ may, depending on the selected intermediate frequency, become mixed to the frequency being detected, resulting in residual modulation. In such a case, the power sample signal should be attenuated with an attenuator, which may also include the switch function 213.

As a prerequisite for transmission power detection by means of a direct conversion receiver according to FIG. 2, in both operating modes the local frequency $f_{LORX}$ must be changed to a frequency $f_{LOTX}+(-)f_{OSC}$ for the duration of the signal detection. This must be taken into account in the design of the frequency synthesizer, SYNTH, 214. Implementation of the direct conversion receiver in the embodiment according to the present invention is especially advantageous, because in said embodiment $f_{LOTX}=f_{LORX}$, whereupon $f_{TX}$ already equals $F_{LORX}+f_{OSC}$. An implementation of a synthesizer is described in FI patent application 945343 filed at the same time as the present application by the present applicant.

Predistortion that utilizes the circuit according to the present invention differs in only two ways from the power regulating loop described above: firstly, the signal that is proportional to the distortion can only be separated after sampling of the demodulized signal with the A/D converter 210, and secondly, regulation is mainly directed to the modulation coefficients $I_K$, $Q_K$, which are input to the modulator 215 of the transmitter. The modulator also may be located in the carrier frequency part of the transmitter, differing from the example shown in the figure. Predistortion according to the present invention is especially advantageous in dual-mode systems that realize both analog and digital operating modes, in which there are no obstacles in the analog operating mode to using an inexpensive, non-linear power amplifier. Predistortion according to the present invention implemented in a digital telephone reduces current consumption.

In principle, predistortion information can also be input to an adjustable amplifier/attenuator, AGC, 211 of the transmitter.

Power regulation and linearization according to the present invention occur during the transmission time period in a system based on time-division. In frequency-division or code-division systems based on continuous transmission or reception, detection can be performed at suitable times, such as during pauses in talking, whereupon no appreciable noise will enter the reception signal. The audio output of the receiver can be muted during detection of the transmission signal. The estimated time required for detection is typically approximately 100 µs, which is only a fraction of the pause occurring in the reception signal during handover, when one base station is changed to another.

Simple regulation of transmission power and linearization of the transmission signal can be realized by means of the present invention without a separate power regulating or predistortion loop and related components. Power regulation and linearization can be realized simultaneously or independently. The dynamics of the receiver are sufficient for accurate detection of both a signal proportional to power and a signal proportional to distortion. Additionally, the sensitivity of the receiver is much greater than that of a diode detector, whereby the power sample can be smaller, resulting in minimal loss in transmission power. In its simplest form, the circuit according to the present invention is made up of only a power divider situated in the transmission power line, one output of which is input to the signal path of the receiver.

Regulation of transmission power to correspond to a given reference value is carried out digitally in the signal processing unit of the device, so the slowness caused by the analog comparator in a regulating loop of the prior art is eliminated with the present invention.

The benefits of the present invention compared to embodiments of the prior art are evident in the accuracy, speed, manufacturing costs, current consumption and space requirements of the regulation. These items are of particular importance in the strongly competitive hand-held telephone market.

In principle, the present invention can be applied in all radio systems implementing known channelling methods, TDD, FDD and CDMA. Neither does the modulating method limit application of the present invention. However, the present invention is most advantageous in time-division systems. Predistortion according to the present invention is advantageous in systems in which non-linear power amplification can not be implemented without linearizing procedures that amplify the transmission signal, due to the modulation method used in said systems, which is based, at least partly, on amplitude modulation, such as differential /4-DQPSK, GMSK and QAM. Dual-mode systems, such as North America's USDMR system, are one application. The present invention is not limited to the above examples, but rather can be applied to the extent permitted by the enclosed claims.

What is claimed is:

1. A method for regulating the power output of a transmitter of a radio device having a transmitter and a receiver, comprising the steps of:

providing an adjustable amplifier in the signal path of the transmitter;

providing an amplified carrier frequency transmission signal from the transmitter to be transmitted by the radio device;

transmitting part of said amplified carrier frequency transmission signal from the transmitter from the radio device and inputting part of said amplified carrier frequency transmission signal from the transmitter to the signal path of the receiver;

detecting a signal proportional to the transmitter output power in the receiver;

providing a reference signal;

producing a control signal which is proportional to the difference between said reference signal and said detected proportional signal; and applying said control signal to said adjustable amplifier, wherein the output of said adjustable amplifier is controlled.

2. A method as in claim 1 wherein the step of detecting a signal proportional to said transmitter output comprises the additional steps of:

providing a second adjustable amplifier in the signal path of the receiver; and providing a second control signal to said second adjustable amplifier, wherein the output of said second adjustable amplifier is constant, said second control signal being proportional to said transmitter output.

3. A method as in claim 1 wherein the step of detecting a signal proportional to the transmitter output power further comprises providing a received signal strength indicator signal of the receiver of the radio device.

4. A method as in claim 1 wherein the step of producing a control signal comprises the initial step of providing a signal processing unit with said detected proportional said signal processing unit calculates said control signal.

5. A method as in claim 1 wherein the step of detecting a signal proportional to said transmitter output power comprises the initial step of detecting I and Q components of a quadrature modulated transmission signal.

6. A method as in claim 1 wherein the step of inputting part of said amplified carrier frequency transmission signal from the transmitter to the receiver of the radio device comprises the step of inputting said transmission signal to the carrier frequency portion of the signal path of the receiver.

7. A method for linearizing a transmission signal of a radio device having a transmitter and a receiver, comprising the steps of:

providing an amplified carrier frequency transmission signal from the transmitter to be transmitted by the radio device;

transmitting part of said amplified carrier frequency transmission signal from the transmitter from the radio device and inputting part of said amplified carrier frequency transmission signal from the transmitter to the receiver of the radio device, at least the latter part of said amplified carrier frequency transmission signal comprising distortion;

detecting a signal proportional to said distortion, wherein said proportional signal is detected in the receiver in accordance with said latter part of said amplified carrier frequency transmission signal;

producing a control signal which is proportional to said detected proportional signal; and applying said control signal to a modulator, wherein the modulation of the transmission signal is linearized.

8. A method as in claim 7 wherein the step of detecting a signal proportional to said distortion comprises the initial step of demodulating the transmission signal.

9. A method as in claim 7 wherein the step of producing a control signal comprises the initial step of providing a signal processing unit with said detected proportional signal, wherein said signal processing unit calculates said control signal.

10. A method as in claim 7 wherein the step of detecting a signal proportional to said distortion comprises the initial step of detecting I and Q components of a quadrature modulated transmission signal.

11. A method as in claim 7 wherein the step of inputting part of an amplified carrier frequency transmission signal of the transmitter to the receiver of the radio device comprises the step of inputting said amplified carrier frequency transmission signal to the carrier frequency portion of the signal path of the receiver.

12. A circuit for regulating the power of a transmission signal of a radio device, comprising:

a radio device having a transmitter and a receiver;

a power divider located in the signal path of said transmitter, wherein the transmission signal from said transmitter is divided into at least two output transmission signals;

means for transmitting one of said output transmission signals from said power divider from the radio device;

a coupling means which electrically communicates one of said output transmission signals from said power divider to the signal path of said receiver;

a first control signal produced within said receiver in accordance with said one of said output transmission signals from said power divider to the signal path of said receiver, wherein said first control signal is proportional to said transmitter output power; and an adjustable amplifier in the transmitter signal path, said adjustable amplifier is controlled by said first control signal.

13. A circuit as in claim 12 wherein said coupling means comprises a controllable switch, wherein at least one of said output transmission signals of said power divider can be controllably connected and disconnected to said signal path of said receiver.

14. A circuit as in claim 12 wherein said coupling means comprises an attenuator.

15. A circuit as in claim 12 wherein said power divider comprises a directional coupler.

16. A circuit as in claim 12 wherein said power divider comprises a capacitor.

17. A circuit as in claim 12 for regulating power of and linearizing a transmission signal of a radio device, further comprising:

a second control signal produced within said receiver, wherein said second control signal is proportional to the distortion present in the transmission signal of said transmitter;

a modulator controlled by said second control signal, whereby the transmission signal is linearized.

18. A circuit as in claim 17 further comprising a signal processing unit, wherein said signal processing unit produces said first control signal and second control signal and provides said first control signal to said amplifier and said second control signal to said modulator.

19. A circuit as in claim 12 wherein said power regulator is an amplifier.

20. A circuit as in claim 12 wherein said power regulator is an attenuator.

21. A circuit as in claim 12 wherein said radio device is a time-division, TDD, radio telephone system.

22. A circuit as in claim 12 wherein said radio device is a frequency-division, FDD, radio telephone system based on continuous transmission and reception.

23. A circuit as in claim 12 wherein said radio device is a code-division, CDMA, radio telephone system based on continuous transmission and reception.

24. A circuit as in claim 12 wherein said receiver is based on direct conversion.

25. A circuit as in claim 12 further comprising a signal processing unit, wherein said signal processing unit produces said first control signal and second control signal and provides said first control signal to said power regulator and said second control signal to said modulator.

26. A circuit for linearizing a transmission signal of a radio device, comprising:

a radio device having a transmitter and a receiver;

a power divider located in the signal path of said transmitter, wherein the transmission signal is divided into at least two output transmission signals;

means for transmitting one of said output transmission signals from said power divider from the radio device;

a coupling means which electrically communicates one of said output transmission signals of said power divider to the signal path of said receiver;

a control signal produced within said receiver in accordance with said one of said output transmission signals from said power divider to the signal path of said receiver, wherein said control signal is proportional to the distortion present in the transmission signal of said transmitter; and a modulator controlled by said control signal, whereby the transmission signal is linearized.

27. A circuit as in claim 26 wherein said coupling means comprises a controllable switch, wherein at least one of said output transmission signals of said power divider can be controllably connected and disconnected to said signal path of said receiver.

28. A circuit as in claim 26 wherein said coupling means comprises a attenuator.

29. A circuit as in claim 26 wherein said power divider comprises a directional coupler.

30. A circuit as in claim 26 wherein said power divider comprises a capacitor.

* * * * *